Patented Mar. 6, 1934

1,950,132

UNITED STATES PATENT OFFICE 1,950,132

THERAPEUTICAL PREPARATION AND THE PRODUCTION THEREOF

Maxwell M. Becker, Kansas City, Mo., assignor to George A. Breon and Company, Incorporated, Kansas City, Mo., a corporation of Missouri No Drawing. Application February 23, 1933, Serial No. 658,237

11 Claims. (Cl. 167—68)

This invention relates to therapeutical preparations, and with regard to certain more specific features, to therapeutical preparations adapted particularly for the treatment of syphilis.

Among the several objects of the invention may be noted the provision of a therapeutical preparation which is effective as a substitute for, or in conjunction with, the use of arsphenamines or mercurials in the treatment of syphilitic cases for the destruction or removal of the spirochetes; a preparation of the class described which functions effectively when alternated with fever-therapy treatments, such as radiotherapy or malarial infections; a preparation of the class described which is substantially painless at the time of injection, either intra-muscular or subcutaneous, and which shows little or no localized or systemic pain after injection; and the provision of a preparation of the class described which is more stable against heat, cold, and actinic rays, than prior preparations of like nature. Other objects will be in part obvious and in part pointed out hereinafter.

The invention accordingly comprises the elements and combinations of elements, steps and sequence of steps, and features of composition and synthesis, which will be exemplified in the products and processes hereinafter described, and the scope of the application of which will be indicated in the following claims.

The use of arsphenamines and/or mercurials in the treatment of syphilitic cases is now generally acknowledged as effective, particularly when the arsphenamine or mercurial injections are alternated with febrile conditions induced either by radiotherapy or by malarial or like inoculation. There is one paramount disadvantage, however, to the use of arsphenamines and/or mercurials, and that is that the human body possesses a certain definite toleration limit for both arsenic and mercury. The particular tolerance varies with the individual, but it always exists. This means that if the injections are multiplied up to the point where the subject's tolerance is equaled, either for arsenic or for mercury, further injections are likely to be toxic and even fatal; all of this before the arsphenamine or mercurial has accumulated in sufficient quantity to eradicate the spirochetes. The present invention supplies a preparation which may be used alone for the treatment of syphilitic cases, or, as is more frequently the case, it may be substituted for the arsphenamines or mercurials when it is thought that the body tolerance is nearly reached. In the latter case, its action seems at least in part to be due to the fact that it liberates, or reactivates, the arsphenamines or mercurials already present in the body to further spirochete-destructive activity.

Broadly described, the present invention comprises a basic bismuth salt of a polyhydroxy-aliphatic alcohol relatively high in the series, and of an organic acid, usually, although not always, an organic hydroxy-acid. The preferred embodiment of the invention comprises (in solution form for injection) a complex double salt of bismuth with mannite (or manitol, $C_6H_8(OH)_6$) and gluconic acid ($C_5H_8(OH)_5COOH$). The precise proportions of bismuth, mannite, and gluconic acid in the product, and their arrangement into one or more chemical compounds, appears to be so complex as to render a determination of the structural formula impracticable. The proportions will be determined, however, by the process by which the preparation is made, such as that described hereinafter.

In place of the mannite, other polyhydroxy-aliphatic alcohols might be used, such as, for example, glycerine ($HOCH_2.CHOH.CH_2OH$), erythritol ($HOCH_2(CHOH)_2CH_2OH$), or adonitol ($HOCH_2(CHOH)_3CH_2OH$).

In place of the gluconic acid, other organic hydroxy-acids might be used, such as salicylic acid ($HO.C_6H_4.COOH$), tartaric acid ($HOOC.(CHOH)_2COOH$), or lactic acid ($CH_3CH(OH)COOH$), the order given being that of preference.

For purposes of illustration, the details for the preparation of the preferred form of the invention (bismuth-mannite-gluconate) will be given:

Bismuth hydrate is provided in freshly-prepared condition. This may be either the bismuth hydrate of commerce, if its freshness may be relied upon, or, more advantageously, bismuth hydrate freshly prepared by precipitation (with thorough washing) with an alkali from an acid solution of a bismuth salt) such as bismuth sub-nitrate). An aqueous alkaline solution is now prepared (such as a solution of potassium hydrate), and in its is dissolved the mannite. The freshly-prepared bismuth hydrate is now carried into solution by adding it to the alkaline mannite solution, the temperature being gradually raised to boiling. The hydrogen-ion concentration is now carefully adjusted with gluconic acid to a pH value of about 9.0 to 9.4. Using gluconic acid, the resultant solution may be stored in concentrated form as thus prepared, but if the other acids enumerated be used, it is desirable that the solution be at once diluted to such a degree that 1 cubic centimeter of solution contains 40 milligrams or whatever therapeutical dose of bismuth, calculated as the metal, may be desired, and then packaged in ampoules, sealed, and sterilized. The gluconic acid preparation should be diluted to the same concentration and packaged in the same manner before distribution, but in this case the dilution and packaging need not be conducted immediately upon completion of the preparation of the concentrated solution.

Proceeding as above, the quantities required are approximately as follows:

|  | Grams |
|---|---|
| Bismuth hydrate | 180 |
| Potassium hydrate | 32 |
| Mannite | 36 |
| Gluconic acid | 87.5 (q. s. to a pH of 9.0–9.4) |
| Water | q. s. |

This yields about 500 cubic centimeters of concentrated solution, which when diluted to the concentration stated yields about 1070 cubic centimeters of preparation ready for injection.

Other methods may be employed for manufacturing the product, such as the following:

An acid solution of a bismuth salt is prepared, as by dissolving bismuth sub-nitrate in dilute nitric acid. Separately, an alkali-metal salt of the chosen organic acid is prepared, as by neutralizing gluconic acid with potassium hydrate. The acid bismuth solution and the alkali-organic salt solution are now mixed and the mixed solution neutralized with an alkali, such as the potassium hydrate theretofore used. When neutrality is achieved, the bismuth salt of the organic acid (in the example given, bismuth gluconate) precipitates, and the precipitate is thoroughly washed and then taken into solution with an alkaline mannite solution, such as the potassium hydrate solution of mannite made as in the first method described. Thereafter, the pH of the solution is adjusted to the desired value (9.0–9.4) with the organic (gluconic) acid, the solution is diluted to the desired concentration, and packaged as heretofore described.

Or, as another example, a commercial or specially prepared bismuth sub-salt of the organic acid chosen (such as bismuth sub-salicylate) may be used directly, the dissolving in alkaline mannite solution, subsequent adjustment of the pH value, and the dilution being the same as in the next preceding example.

The resultant product, however it be prepared, comprises a complex bismuth salt of the acid and alcohol employed, in a solution of pH value of 9.0–9.4, and at a concentration of approximately 40 milligrams (or other therapeutic dose) of metallic bismuth per cubic centimeter. The ordinary injection comprises one cubic centimeter of the solution. In the usual treatment, 12 to 24 injections are given at intervals of about two to three days.

The preparation, when administered by intramuscular or subcutaneous injection, diffuses rapidly into the body tissues and is absorbed thereby. All of the substances present are compatible with human tissues and tissue secretions, so that no undesirable precipitation either within or without the tissues is encountered.

The therapeutic action of the preparation on the spirochetes seems to be a function of the bismuth and the organic acid. The polyhydroxy alcohol accomplishes several functions, one of which is the stabilization of the preparation against precipitation due to the action of light, heat, or cold. The chief function of the alcohol, however, is to reduce the pain incident to the injection. With the mannite preparation described, for example, no pain is noticed at the seat of the injection either at once or after a lapse of hours, and very little systemic pain develops throughout the first twelve hours after injection, all pain having disappeared after twelve hours. The mannite further functions, in a manner not at present understood, to reduce the toxicity of the preparation. Experiments have been conducted on rats with the bismuth-mannite-gluconate preparation, large doses (in one case, over 300 times the normal human dose) being given without a single death.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

I claim:

1. A therapeutic preparation for the treatment of syphilis comprising a bismuth salt of a polydroxy-alcohol and an organic hydroxy-acid.

2. A therapeutic preparation for the treatment of syphilis comprising a bismuth salt of mannite and an organic hydroxy-acid.

3. A therapeutic preparation for the treatment of syphilis comprising a bismuth salt of mannite and gluconic acid.

4. A therapeutic preparation for the treatment of syphilis comprising a bismuth salt of mannite and salicylic acid.

5. A therapeutic preparation for the treatment of syphilis comprising a bismuth salt of mannite and tartaric acid.

6. A therapeutic preparation for the treatment of syphilis comprising a solution including the reaction products of a salt of bismuth, a polyhydroxy-alcohol, and an organic hydroxy-acid.

7. A therapeutic preparation for the treatment of syphilis comprising a solution including the reaction products of a salt of bismuth, a polyhydroxy-alcohol, and an organic hydroxy-acid, the pH value of said solution being of the order of 9.0 to 9.4.

8. A therapeutic preparation for the treatment of syphilis comprising a solution including the reaction products of a salt of bismuth, mannite, and gluconic acid, the pH value of said solution being of the order of 9.0 to 9.4.

9. A therapeutic preparation for the treatment of syphilis comprising a solution including the reaction products of a salt of bismuth, mannite, and gluconic acid, the pH value of said solution being of the order of 9.0 to 9.4, and the concentration of said solution being such that one cubic centimeter contains approximately 40 milligrams of metallic bismuth.

10. The process of preparing a therapeutic preparation comprising dissolving bismuth hydrate and a polyhydroxy-alcohol in an alkaline medium, and bringing the pH value of the solution to the order of 9.0 to 9.4 with an organic hydroxy-acid.

11. The process of preparing a therapeutic preparation comprising dissolving bismuth hydrate and mannite in a potassium hydrate solution, and adjusting the pH value of the solution to the order of 9.0 to 9.4 with gluconic acid.

MAXWELL M. BECKER.